| United States Patent [19] | [11] | 4,035,349 |
|---|---|---|
| Finley et al. | [45] | July 12, 1977 |

[54] INHIBITING THE FORMATION OF LYSINOALANINE

[75] Inventors: John W. Finley, Martinez; John T. Snow, Berkeley; Mendel Friedman, Moraga, all of Calif.

[73] Assignee: The United States of America as represented by the Secretary of Agriculture, Washington, D.C.

[21] Appl. No.: 585,212

[22] Filed: June 9, 1975

[51] Int. Cl.$^2$ .......................................... A23J 1/14
[52] U.S. Cl. ............................ 260/123.5; 260/112 R
[58] Field of Search ......... 260/112 R, 112 G, 123.5

[56] References Cited

U.S. PATENT DOCUMENTS

| 2,431,993 | 12/1947 | Davidson | 260/123.5 |
| 2,547,980 | 4/1951 | Saunders | 260/123.5 |
| 2,887,395 | 5/1959 | Rowe | 260/123.5 |
| 3,586,662 | 6/1971 | O'Connor | 260/123.5 |
| 3,620,772 | 11/1971 | Nitada | 260/112 R |

OTHER PUBLICATIONS

Chemical Abstracts, vol. 66, No. 104088p, Wren, 1967.

*Primary Examiner*—Paul R. Michl
*Attorney, Agent, or Firm*—M. Howard Silverstein; David G. McConnell

[57] ABSTRACT

Method for inhibiting the formation of lysinoalanine when proteinous material is treated by alkali, which comprises conducting the alkali treatment in the presence of a compound selected from the group consisting of sulfhydryl-containing amino acids, their esters, and amides.

6 Claims, No Drawings

INHIBITING THE FORMATION OF LYSINOALANINE

DESCRIPTION OF THE INVENTION

The invention relates to and has among its objects processes for treating proteinous materials with alkali while inhibiting the formation of lysinoalanine. Further objects of the invention will be evident from the following description wherein parts and percentages are by weight unless otherwise specified.

Proteinous materials are commonly treated with alkali in the course of preparing protein concentrates or isolates for food or feed use. For example, in preparing soy protein concentrates a usual step is to extract soybeans with aqueous alkali and then precipitate the protein from the resulting solution. Similar alkali treatments are used in recovering proteins from such sources as cereal grains and milling by-products, and oilseeds such as peanuts, safflower seed, cottonseed, flaxseed, etc. Procedures are also known wherein proteins—such as soy protein—are modified by treatment with alkali to induce optimum adhesive properties for use in preparing textured foods.

Heretofore, it has been shown that when rats are fed a diet containing alkali-treated soy protein they suffer nephrotoxic effects. Woodard et al (Journal of Nutrition, Vol. 103, Pages 569–574) investigated this problem and found that the nephrotoxic factor in the alkali-treated protein is heat stable and cannot be extracted with such solvents as water, methanol, chloroform, and hexane. Their studies demonstrated that the toxic factor is an unusual amino acid which is chemically bound to the protein chain, and that this amino acid is $N^\epsilon$-(DL-2-amino-2-carboxyethyl)-L-lysine. They assigned to it the abbreviated name "lysinoalanine", the latter being also used herein.

Lysinoalanine has the structure

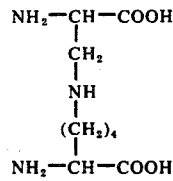

It is evident from the foregoing that the presence of lysinoalanine in products designed for use by humans or animals is undesirable.

The invention described herein provides the means for obviating the problem outlined above. In the process the invention the alkali treatment of the proteinous material is carried out in the presence of an agent which inhibits the formation of lysinoalanine. The agent in accordance with the invention is selected from the group consisting of sulfhydryl-containing amino acids, their esters, and amides. The preferred agents of the invention are cysteine and its esters and amides. Thus, for example, one can use cysteine itself

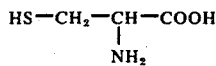

or its esters, such as those of the follwing formula wherein R represents an alkyl group containing 1 to 4 carbon atoms

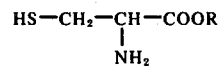

or its amides such as those of the following formula wherein R represents an alkyl group containing 1 to 4 carbon atoms

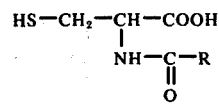

Also preferred for use in accordance with the invention are α-mercaptopropinonyl glycine and its esters. These compounds are represented by the formula

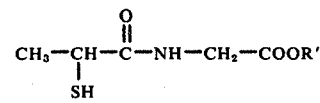

wherein R' is hydrogen or an alkyl group containing 1 to 4 carbon atoms.

An alternative, but less preferred, agent is glutathione, which may be represented by the formula

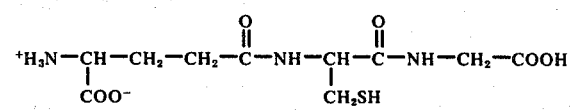

The practice of the invention is outstanding in its simplicity in that it merely requires that the alkali treatment of the proteinous material be carried out in the presence of the agent. Thus, except for addition of the agent, the alkali treatment is carried out in conventional manner. The amount of the agent to be used is dependent on the kind of protein and the amount thereof in the proteinous material, and the particular agent employed. In general, one uses an amount of the agent which is sufficient to inhibit the formation of lysinoalanine. In any particular case, the amount required to achieve this end can be determined by conducting pilot trials with various amounts of the agent, and from the results ascertaining the amount of additive required for the main batch. In many cases about 1% of the agent, based on the amount of protein, has been found to yield good results.

It is believed that when proteinous material is treated with alkali, lysinoalanine is produced in the following way: The alkali acts upon the cystine portion of the protein and degrades it to a dehydroalanine unit, which subsequently reacts with a lysine unit to form a lysinoalanine unit in the protein molecule. These reactions may be represented as follows:

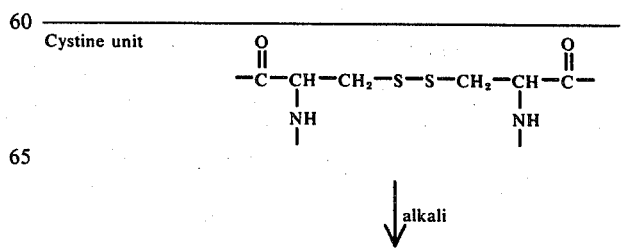

-continued

Dehydroalanine unit
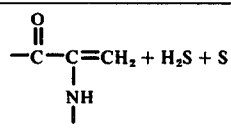

Lysine unit
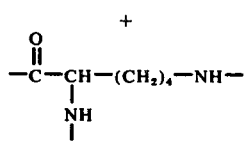

Lysinoalanine unit
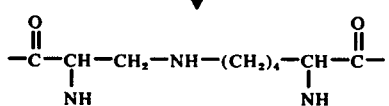

However, when an agent in accordance with the invention (cysteine, for example) is present during the alkali treatment, it is believed that the dehydroalanine unit preferentially reacts with the cysteine rather than with lysine. Consequently, the formation of lysinoalanine is avoided. The reactions are schematically illustrated as follows:

Dehydroalanine unit
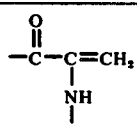

Cysteine
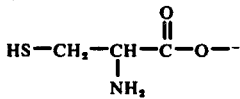

Lanthionine unit
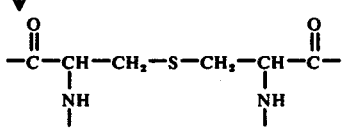

It should be noted, however, that the foregoing theory forms no part of the invention. Regardless of the actual mechanism involved, the process of the invention does result in inhibiting the formation of lysinoalanine.

The invention is further demonstrated by the following illustrative examples.

EXAMPLE 1

A. A standard procedure for isolating soybean protein was followed. To this end, 100 g. soybean flour was mixed with 1 liter of dilute aqueous sodium hydroxide (pH 9.0). The mixture was allowed to stand at room temperature for several hours, and then centrifuged for 5 minutes at 5000 rpm. The supernatant was collected and its pH was adjusted to 4.5 by the addition of hydrochloric acid to precipitate the soybean protein which was then separated from the residual liquor.

B. The procedure described in part A was repeated, except that in this case 1 g. of N-acetyl cysteine mixture was mixed with the soybean flour and sodium hydroxide solution when the isolation procedure was started.

The protein products prepared by the above procedures were subjected to amino acid analysis wherein the sample is acid-hydrolyzed to its component amino acids which are then subjected to chromatography. The amounts of lysinoalanine in the test samples were determined from the relative peak heights.

The results are summarized below:

| Run | Agent used | Lysinoalanine Relative concentration per mg. of protein |
|---|---|---|
| A | None | 7.2 |
| B | N-acetyl cysteine | <0.01 |

EXAMPLE 2

A. A 10-gram sample of soybean protein was mixed with 0.1 g. of N-acetyl cysteine and 100 ml. of 0.1 N aqueous sodium hydroxide solution. The mixture was held at 60° C. for 8 hours. The mixture was then cooled and analyzed for lysinoalanine as previously described.

B. The above experiment was repeated exept that α-mercaptopropionyl glycine (1%) was used in place of N-acetyl cysteine.

C. Finally a control was run wherein the above experiment was repeated without the addition of N-acetyl cysteine or α-mercaptopropionyl glycine.

The results are tabulated below.

| Run | Agent used | Lysinoalanine Relative concentration per mg. of protein |
|---|---|---|
| A | N-acetyl cysteine | 0.92 |
| B | α-mercaptopropionyl glycine | 0.44 |
| C | None | 10.00 |

Having thus described our invention, we claim:
1. In the process of treating a vegetable protein with alkali, the improvement which comprises
conducting the alkali treatment in the presence of an added compound selected from the group consisting of sulfhydryl-containing amino acids, their esters, and amides,
said compound being added in an amount sufficient to inhibit the formation of lysinoalanine.
2. The process of claim 1 wherein the compound is cysteine.
3. The process of claim 1 wherein the compound is N-acetyl cysteine.
4. The process of claim 1 wherein the compound is α-mercaptopropionyl glycine.
5. The process of claim 1 wherein the compound is added in an amount of about 1%, based on the weight of vegetable oil.
6. The process of claim 1 wherein the vegetable protein is soybean.